Figure 1:
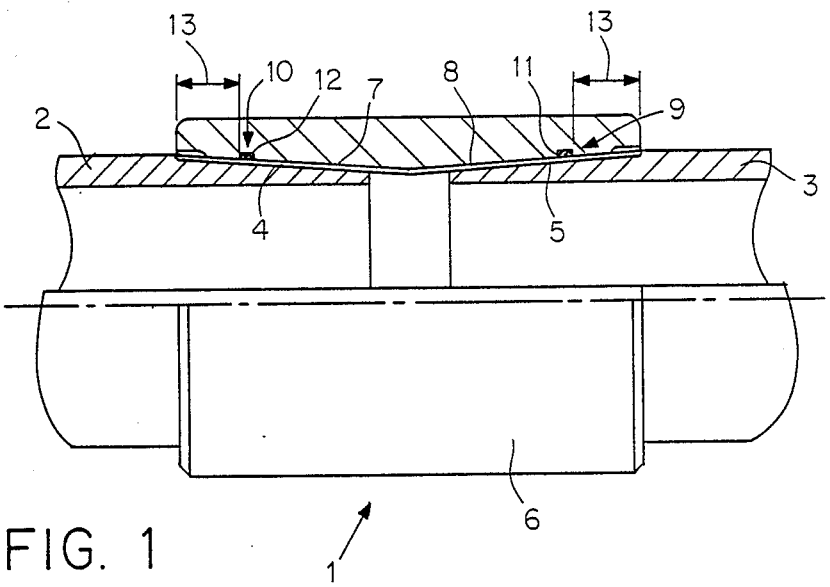

United States Patent [19]

Gross et al.

[11] Patent Number: 4,969,671
[45] Date of Patent: Nov. 13, 1990

[54] GAS-TIGHT JOINT FOR PIPE LININGS AND RISERS

[75] Inventors: Heinz Gross, Dortmund-Syburg; Friedrich-Otto Koch, Unna-Massen; Matthias Lang, Pforzheim; Adolf Peeck, Wiedendahl; Hans Spliethoff, Münster; Wolfgang Venema, Ahlen; Jürgen Duisberg, Hagen; Robert Scholl, Dortmund, all of Fed. Rep. of Germany

[73] Assignee: Hoesch Aktiengesellschaft, Dortmund, Fed. Rep. of Germany

[21] Appl. No.: 538,688

[22] Filed: Jun. 15, 1990

Related U.S. Application Data

[63] Continuation of Ser. No. 363,286, Jun. 7, 1989, abandoned, which is a continuation of Ser. No. 151,418, Feb. 2, 1988, abandoned.

[30] Foreign Application Priority Data

Feb. 3, 1987 [DE] Fed. Rep. of Germany ....... 3703052

[51] Int. Cl.$^5$ .............................................. F16L 25/00
[52] U.S. Cl. .................................... 285/333; 285/355; 285/369; 285/910
[58] Field of Search .................. 285/332.2, 332.3, 333, 285/355, 390, 910

[56] References Cited

U.S. PATENT DOCUMENTS

| | | | |
|---|---|---|---|
| 1,168,196 | 1/1916 | Hall | 285/45 |
| 2,380,690 | 7/1945 | Graham | 285/332.3 X |
| 2,980,451 | 4/1961 | Taylor et al. | 285/333 X |
| 3,201,155 | 8/1965 | Billeter et al. | 285/355 X |
| 3,540,065 | 11/1970 | Gidner et al. | 285/355 X |
| 3,850,461 | 11/1974 | Fujioka et al. | 285/332.2 |
| 3,879,071 | 4/1975 | Gockler | 285/355 X |
| 4,253,687 | 3/1981 | Maples | 285/909 X |
| 4,703,959 | 11/1987 | Reeves et al. | 285/332.3 |
| 4,711,474 | 12/1987 | Patrick | 285/332.3 |

FOREIGN PATENT DOCUMENTS 8701787 3/1987 World Int. Prop. O. ....... 285/332.3

*Primary Examiner*—Dave W. Arola
*Attorney, Agent, or Firm*—Max Fogiel

[57] ABSTRACT

A gas-tight joint for pipe linings and risers inside a bore, consisting of a neck with an outside thread and of a matching collar with an inside thread, with a groove in the vicinity of the thread on the collar and/or of the thread on the neck to accommodate a deformable gasket that, when the joint is screwed tight, is demarcated and deformed by the base of the groove in the neck and/or in the collar and by the contour of the thread on the other component. The cross-sectional area demarcated by the base of the groove in the neck and/or collar and by the contour of the thread on the other component once the two components have been screwed together remains constant along the groove and is equal to or larger than the cross-sectional area of the deformable gasket before the components are screwed together.

5 Claims, 2 Drawing Sheets

GAS-TIGHT JOINT FOR PIPE LININGS AND RISERS

The present application is a continuation of the parent application Ser. No. 363,286 filed June 7, 1989 which is a continuation of application Ser. No. 151,416 filed Feb. 2, 1986 and now abandoned.

The invention concerns a gas-tight joint for pipe linings and risers inside a bore, consisting of a neck with an outside thread and of a matching collar with an inside thread, with a groove in the vicinity of the thread on the collar and/or of the thread on the neck to accommodate a deformable gasket that, when the joint is screwed tight, is demarcated and deformed by the base of the groove in the neck and/or in the collar and by the contour of the thread on the other component.

A pipe joint of this type, which is very simple to establish, is known for example from API Specification 5A, Casing, Tubing and Drill Pipe, which describes threaded bushings with two grooves in the vicinity of the thread for accommodating gaskets made essentially out of polytetrafluor ethylene (Teflon). The grooves are of constant width around their circumference.

The gaskets are incised by the threads as the collar is screwed over the neck and forced into the grooves.

There is, however, a drawback to this type of joint in that individual turns of the thread on the neck or collar can get forced out of shape by the Teflon gasket itself, which, although deformable, is not compressible. Furthermore, the rated cross-section of the gasket is so large that some of the material the gasket is made out of can get forced out of the groove in the vicinity of the thread, causing the neck to contract or the collar to expand to some extent and making the joint leak.

A similar joint is known from German AS 2 316 059. The groove that accommodates the gasket (12) is upstream or downstream of the thread on the collar although still overlapped by the thread on the neck.

The drawbacks to this joint are that the collar has to be long enough to accommodate the width of the groove along with the extremely high and uncontrolled compression of the gasket, which can contribute to loosening of the metal sealing surfaces or threads.

The object of the present invention is accordingly to provide a standard pipe joint that will be gas-tight and water-tight, that will reliably convey a medium, and that can be established extremely easily with a deformable gasket, whereby the seal will not be destroyed by uncontrolled compression of the ring and subsequent shearing off of the thread turns or by loosening of the thread no matter how tight the components are screwed together.

This object is attained in accordance with the invention by the characteristics recited in the body of the major claim.

The characteristics of further developments are recited in the subsidiary claims.

Employing as a point of departure the overall theory of the invention, specifically to act on the deformable gasket utilized to establish a pipe joint only to the extent of shaping the gasket within the grooves in the vicinity of the threads without allowing deleteriously high pressure to become established between the surfaces of the threads due to uncontrollable compression, the pipe joint disclosed herein provides, by making the cross-sectional area between the base of the groove in the neck or in the collar and the contour of the thread on the other component constant over the whole groove, the advantage of screwing the two components together easily while attaining reliable tightness within a narrow and defined range of torque.

Surprisingly, although keeping the width of the grooves constant although completely elective along their circumference has previously been considered when producing grooves for use with gaskets, advantage has not been taken of the situation that, whereas the groove is stationary along the circumference, the turns of the threads vary their position in relation to the groove in very small increments along the circumference. The cross-sectional area enclosed by the base of the groove in conjunction with the contour of the thread accordingly varies over the circumference in the joints at the state of the art.

It is only by maintaining the aforesaid cross-sectional area constant over the total circumference, however, that it is possible to ensure reliable gas tightness. Another advantage can be attained by making this area equal to or larger than the cross-sectional area of the deformable gasket before the pieces are screwed together. This measure will ensure that the gasket will be deformed at constant volume when the components are screwed together and will not be subjected to any compression, eliminating excessively high pressure in the vicinity of the threads.

In addition to varying the width or depth of the groove along the circumference in accordance with the variation in the contour of the thread, there is another especially simple method of maintaining the cross-section between the base of the groove and in the neck or collar and the contour of the thread in the other component that consists of making the width of the groove n times the pitch of the thread, whereby n is a whole number equal to or larger than 2.

In addition to providing a level of deformation that the Teflon gasket can still accept, this method will, at n=0, ensure that the sum of the distances of the points on the contour of the thread from the midline of the flank will be 0 or more no matter how close together the points are. Thus all the crests of the threads will, beginning with the midline of the flanks, "fit" into the valleys, and the enclosed cross-section will remain constant.

Depending on the aggressiveness and consistency of the media being conveyed in the pipeline, the gaskets can be either metal or plastic in accordance with the desired life of the joint.

Figure 2:
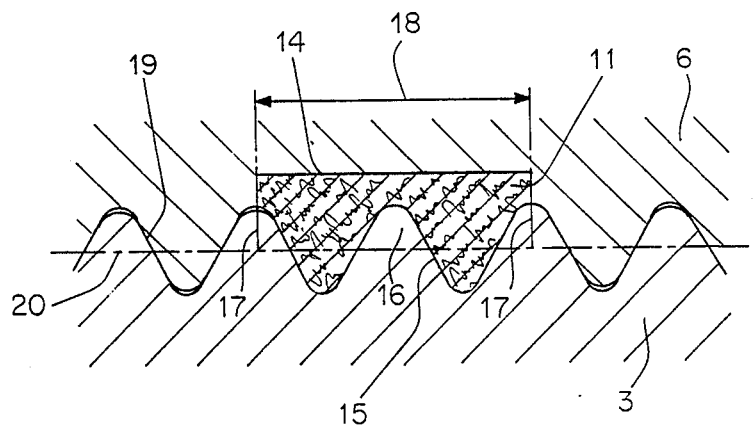
Figure 3:
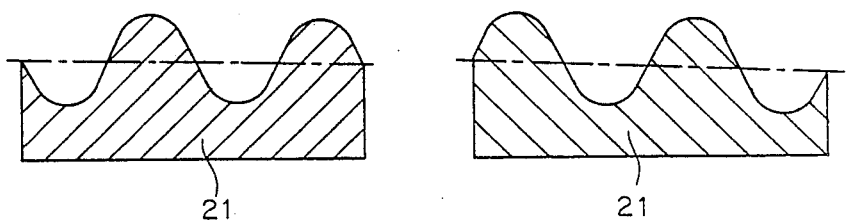

One embodiment of the invention will now be specified with reference to the drawings, wherein FIG. 1 is a semisectional view of a gas-tight neck-and-collar pipe joint in accordance with the invention, FIG. 2 is a larger-scale section through a gasket deformed when the two components were screwed together, and FIG. 3 illustrates the area between the base of the groove in the collar and the contour of the thread in the neck, an area that varies in shape in relation to the groove but remains constant in size, at a distance equal to ½ the circumference of the groove.

FIG. 1 illustrates a standard 5½" pipe-lining joint 1, whereby the pipes being connected are 139.7 mm in diameter and have walls 6.98 mm thick and whereby the ends 2 and 3 of both pipes have conical outside threads 4 and 5. A collar 6 has matching conical inside threads 7 and 8 and connects both pipe ends in the screwed-together state illustrated herein.

These particular threads (4, 5, 7, & 8) are long knuckle threads (LTC) in accordance with API Specification 5B. The grooves 9 and 10 that accommodate gaskets 11 and 12 in the illustrated embodiment are incised in the threaded area of collar 6 at a distance 13 from each end of the collar.

FIG. 2 is a larger-scale section illustrating gasket 11 molded between the base 14 of the groove and the contour of thread 15 at any point along the circumference of collar 6. The original shape and area 16 of gasket 11 before the components were screwed together is represented by dot-and-dash line 17. Also evident is the minimum width 18 of base 14 of two thread turns that is necessary to limit the degree of deformation of the polytetrafluor-ethylene gasket and to maintain a constant enclosed cross-section along the circumference of the groove. Mathematical integration of the components of the area demarcated by thread contour 19 and flank midline 20 along minimum width 18 will result in a value of zero or more in accordance with the invention.

FIG. 3 illustrates how a cross-sectional area 21 of constant size between the base 14 of the groove in the collar and the contour of the thread 15 in the neck changes shape in relation to groove 9 within half a circumference.

We claim:

1. A gas-tight joint for pipe linings and risers inside a bore, comprising: a neck member with an outside thread and a collar with an inside thread for cooperating with said outside thread; groove means adjacent to the thread on at least the collar; a deformable noncompressible gasket demarcated and deformed by the base of said groove means and by the cooperating thread when the joint is screwed tight, said deformable noncompressible gasket retaining a constant volume under deformation, squeezed parts of said gasket being prevented from entering neighboring threads when said gasket is deformed; a first cross-sectional area being demarcated by the base of said groove means and by the cooperating thread when said neck member and said collar are screwed together; said first cross-sectional area remaining constant along the entire circumference of said groove means after said neck member and said collar are screwed together; said deformable gasket having a second cross-sectional area before said neck member and said collar are screwed together; said first cross-sectional area being at least equal to said second cross-sectional area; the base of said groove means having a width corresponding to n times the pitch of said threads, where n is a whole number at least equal to 2.

2. A gas-tight joint for pipe linings and risers inside a bore, comprising: a neck member with an outside thread and a collar with an inside thread for cooperating with said outside thread; groove means adjacent to the thread on at least the collar; a deformable noncompressible gasket demarcated and deformed by the base of said groove means and by the cooperating thread when the joint is screwed tight, said deformable noncompressible gasket retaining a constant volume under deformation, squeezed parts of said gasket being prevented from entering neighboring threads when said gasket is deformed; a first cross-sectional area being demarcated by the base of said groove means and by the cooperating thread when said neck member and said collar are screwed together; said base of said groove means being so dimensioned and positioned relative to said threads that said first cross-sectional area remains constant along the entire circumference of said groove means after said neck member and said collar are screwed together independent of cylindrical or conical shapes of the thread; said deformable gasket having a second cross-sectional area before said neck member and said collar are screwed together; said first cross-sectional area being at least equal to said second cross-sectional area.

3. A gas-tight joint for pipe linings as defined in claim 2, wherein the base of said groove means has a width corresponding to n times the pitch of said threads, where n is a whole number at least equal to 2.

4. A gas-tight joint as defined in claim 2, wherein said deformable gasket is comprised of metal.

5. A gas-tight joint as defined in claim 2, wherein said deformable gasket is comprised of plastics.

* * * * *